April 24, 1956  E. PICK  2,743,016

STRAINERS

Filed Dec. 6, 1952

*INVENTOR:*

*Eric Pick*

United States Patent Office 2,743,016
Patented Apr. 24, 1956

2,743,016
STRAINERS

Eric Pick, East Rockaway, N. Y., assignor to The Permutit Company, New York, N. Y., a corporation of Delaware Application December 6, 1952, Serial No. 324,456

1 Claim. (Cl. 210—169)

This invention relates to strainers and it comprises a unitary strainer disc comprising a discoid portion, a rim of dovetail shaped cross-section surrounding said discoid portion, and bosses integrally formed on said discoid portion, the thickness of said disc through said bosses being greater than the thickness of said rim at its periphery and the thickness of said rim at its periphery in turn being greater than the thickness of said discoid portion, and aperture means in said discoid portion, said disc being advantageously made of a plastic material, and a stack of such disc being assembled with closure means at each end to form a strainer, all as more fully described hereinafter and as claimed.

It is an object of this invention to provide a strainer which is effective in operation, which is impervious to the action of the fluid being strained and which is simple and inexpensive to manufacture. Another object is to provide a strainer which is assembled of a plurality of similar unitary discs molded from a plastic material. A further object is to provide a strainer in which the tendency to become clogged is minimized, but which, when it does become clogged, may be cleaned easily and conveniently.

The manner in which these and other objects of my invention are achieved is shown in the appended drawings in which.

Figure 1:
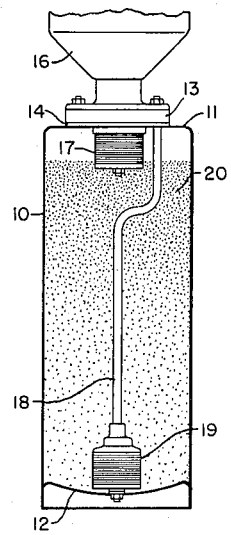
Fig. 1 is a view partly in section through an ion exchange water softener employing strainers according to my invention.

Referring now to Fig. 1, a tank 10 has a top head 11 and a bottom head 12. A valve mechanism 13 with a plate 14 and an interposed gasket 15 (see Fig. 2) is attached to the top head 11. A salt chamber 16 in turn is attached to the valve mechanism 13. Mounted against the plate 14 is a top strainer 17. An internal tube 18 leads from the valve mechanism 13 to a bottom strainer 19 mounted on the bottom head 12. The tank 10 contains granular or bead-like ion exhange material 20. This apparatus is of the type described in detail in the co-pending Carlsson and Pick application Serial No. 245,134, filed September 5, 1951, now Patent No. 2,680,714.

Figure 2:
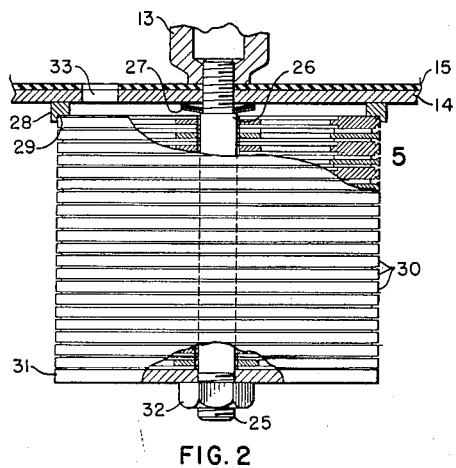
Fig. 2 is a view, partly in section and on a larger scale, of the top strainer 17 of the apparatus shown in Fig. 1.

The top strainer 17 is shown in greater detail in Fig. 2. It comprises a stud 25 having a shoulder 26 which retains a gasket 27 made from a combination of a metal disc and a washer of soft resilient organic material. The stud 25 is screwed into a portion of the valve mechanism 13. On the underside of plate 14 is placed a ring 28 provided with a rabbet 29 into which fits one of a stack of strainer discs 30. Against the lower end of the stack of discs 30 is placed a plate 31 held in place by a nut 32. An opening 33 in plate 14 provides a fluid passage interconnecting the valve mechanism 13 with the space on the inside of the stack of discs 30.

Figure 3:
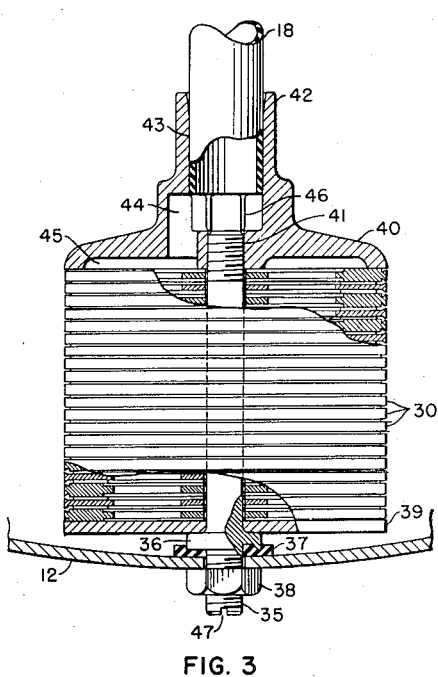
Fig. 3 is a view similar to that of Fig. 2, of the bottom strainer 19 of the apparatus shown in Fig. 1.

The bottom strainer 19, as shown in Fig. 3, comprises a stud 35 having an integral flange 36 formed thereon which is pressed against a gasket 37 resting on the bottom head 12. A nut 38 screwed over the lower end of stud 35 holds it firmly on the bottom head 12. Over the stud 35 is placed a plate 39, a stack of strainer discs 30, and a top member 40. The top member 40 is provided with a central threaded hole 41 into which the upper end of stud 35 is screwed to hold the assembled strainer together. The top member 40 has a projection 42 with a bore 43 therein to receive the lower end of tube 18. A passage 44 interconnects the bore 43 with a cavity 45 in the lower face of the top member 40 and thence with the space on the inside of the stack of discs 30. In the lower portion of bore 43 are ridges 46 to form stops and prevent the tube 18 from sliding further down within the bore 43. A slot 47 provided in the lower end of stud 35 permits the insertion of a screw driver to keep the stud 35 from rotating while the nut 38 is being tightened or removed.

Figure 5:
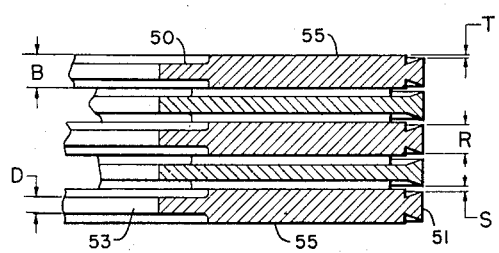
Fig. 5 is a fragmentary view of the portion of Fig. 2 adjacent to the numeral 5, enlarged approximately five times, the section through adjacent discs being taken alternately along lines 5—5 and 5A—5A shown in Fig. 4.
Figure 4:
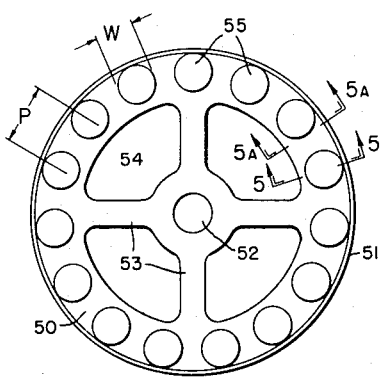
Fig. 4 is a plan view of a strainer disc.

Each disc 30, as shown more clearly in Figs. 4 and 5, comprises a discoid portion 50 surrounded by a rim 51 of dovetail shape cross-section bound by a cylindrical surface at the periphery of the disc and two surfaces each joined to said cylindrical surface at its larger diameter, the junction between each of said two surfaces and said cylindrical surface forming an edge. Each disc 30 has a central bore 52 and spokes 53 defining apertures 54 in the discoid portion 50. Adjacent to the rim 51 and preferably on both sides of each disc 30 are bosses 55 arranged on a circular pattern in such manner that the center distance P between adjacent bosses 55 is greater than the width W of one boss but smaller than twice the width of one boss (see Fig. 4). This simply means that the bosses are wider than the spaces between the bosses so that a boss on one disc of a stack cannot enter the space between two adjacent bosses on an adjacent disc, and for this purpose this relationship between the width of the bosses and the spaces between the bosses should be as stated even if the bosses are of a shape other than round, or if they are of unequal width.

My particular arrangement of the bosses 55 as to the relationship between width and spacing makes it unnecessary to align the adjacent strainer discs 30 angularly because a boss 55 of any disc 30 will always contact at least a portion of a boss 55 on the next adjacent disc 30.

The thickness B through the bosses 55, as shown in Fig. 5, is greater than the thickness R of the rim 51 at its periphery and the thickness R in turn is greater than the thickness D of the discoid portion. The bosses 55 preferably project axially beyond the peripheral edge of the rim 51 on each side of the disc 30 by equal amounts T so that when a plurality of discs 30 are assembled into a stack a fluid straining slot of a width $$S = 2T$$

is formed between the peripheral edges of the rims 51 of adjacent discs 30. The principal advantage of making the dimension T on both sides of each disc equal is that no particular care need be exercised in assembling each stack of discs. In other words, any disc may be turned end for end without changing the width S of the slots formed between adjacent discs, but that would not be true if the dimension T on the two sides of a disc were unequal.

Such discs 30 can easily and accurately be molded from a plastic material such as polyvinyl chloride, polystyrene, or the like. Satisfactory discs can be made with a diameter of 3 to 4 inches with a thickness B of approximately $\frac{1}{16}$ inch, a thickness D of $\frac{1}{32}$ inch, and a dimension T selected to provide a slot S which will satisfactorily exclude whatever solid substances are to be strained out. In the water softener illustrated in Fig. 1 containing bead-like cation exchange material of a mesh size ranging from about 60 mesh up, a satisfactory dimension T would be between 0.003 and 0.004 inch, making a slot S varying between 0.006 and 0.008 inch. A particle which would just fit into this slot S would have a diameter of .008 inch (corresponding to the opening in a 70 mesh screen) so that in this manner ion exchange material of a size larger than 60 mesh can effectively be excluded by the strainer. All of the foregoing dimensions may of course be altered to suit any particular use to which my strainer is to be adapted. The dimension T is advantageously so selected as to provide a slot width S which is just wide enough to hold back the particles to be strained out.

In Figs. 2 and 3 the thickness of the discs 30 has been exaggerated in the interest of clarity of presentation, but in Fig. 5 such distortion is minimized.

In operation of the apparatus shown in Fig. 1, water or regenerant solution is admitted by the valve mechanism 13 either to the internal tube 18 to pass outwardly through the bottom strainer 19, upward through the ion exchange material 20 and out through the top strainer 17 and passage 33, or through passage 33 into the top strainer 17 to pass downwardly through the ion exchange material 20 and out through the bottom strainer 19 and the internal tube 18. With either direction of flow, one or the other of the two straniers 17 and 19 will prevent any ion exchange granules or beads from leaving the tank with the water or other liquid passing through it.

Because of the dovetail shaped cross-section of the rim 51, particles that are able to enter the slot S will pass through since they immediately encounter a passage of gradually increasing width. On the other hand, particles too large to enter into the slot S will be held against the slot by the force of the outflowng fluid, but for the greater part drop from the strainer as soon as the flow stops.

If a strainer should eventually become clogged with solid particles it is easy to clean. By merely loosening the stack of discs, as by unscrewing nut 32 a few turns, it is possible to release the grip on any particles caught in the slots so that they may readily be brushed off or washed out.

Strainers comprising stacks of similarly shaped unitary discs according to my invention can, of course, be used in applications other than water softeners whenever fluids are to be withdrawn through pipes and where the entrance of solid particles is to be prevented. Another example for the use of such strainers is on the suction pipes of deep and shallow wells. For such use as well screens it is sometimes desirable to provide a drive point at the end of the stack of discs so that the well suction pipe may be driven into the ground.

While I have shown and described what I consider the preferred embodiments of my invention, modifications may be made without departing from its spirit and reference is therefore made to the appended claim for definition of the scope of my invention.

What I claim is:

A strainer comprising a stack consisting of a plurality of similarly shaped reversible unitary discs made of moldable rigid plastic material impervious to the action of water, each disc having a rim of dovetail shaped cross-section, said dovetail shaped cross-section being bound by a cylindrical surface at the periphery of each disc and two surfaces each joined to said cylindrical surface at its larger diameter, the junction between each of said two surfaces and said cylindrical surface forming an edge; bosses on both sides of said disc arranged in a circular pattern immediately adjacent to said two surfaces and projecting equal distances beyond the edge of said rim; the width of said bosses being greater than the space between adjacent bosses, a plurality of apertures in said disc, closure means for both ends of said stack, a cylindrical member passing through one of said apertures centrally located in each disc holding said stack and closure means together, and a fluid passage in one of said closure means, said stack providing a plurality of continuous circular filter passages, each of said filter passages being located between said edges of two adjacent discs.

References Cited in the file of this patent
UNITED STATES PATENTS

| | | |
|---|---|---|
| 1,688,326 | Boulade | Oct. 23, 1928 |
| 2,000,490 | Mandahl | May 7, 1935 |
| 2,188,643 | Laderer | Jan. 30, 1940 |
| 2,444,147 | Walton | June 29, 1948 |
| 2,583,423 | Hallinan | Jan. 22, 1952 |
| 2,699,261 | Britton et al. | Jan. 11, 1955 |

FOREIGN PATENTS

| | | |
|---|---|---|
| 358,496 | Great Britain | Oct. 5, 1931 |
| 726,783 | Germany | Oct. 20, 1942 |